United States Patent

[11] 3,567,065

| [72] | Inventor | Alfred F. Dinse |
| | | Grand Prairie, Tex. |
| [21] | Appl. No. | 804,845 |
| [22] | Filed | Mar. 6, 1969 |
| [45] | Patented | Mar. 2, 1971 |
| [73] | Assignee | Interlake Steel Corporation |
| | | Chicago, Ill. |

[54] HINGE STRUCTURE FOR A COOKING-GRILL CONSTRUCTION
4 Claims, 4 Drawing Figs.

[52] U.S. Cl. .................................................. 220/31, 220/32, 16/177
[51] Int. Cl. .................................................. B65d 51/10, A47j 36/12
[50] Field of Search .................................... 220/31, 32; 217/60; 16/177, 191

[56] References Cited
UNITED STATES PATENTS

| 756,586 | 5/1904 | Clemens................... | 16/191 |
| 1,631,365 | 6/1927 | Fahrenfeld................ | 16/177 |
| 2,168,604 | 8/1939 | Lee........................... | 220/31 |
| 2,808,611 | 8/1957 | Bauermeister............ | 16/177 |

FOREIGN PATENTS

| 376,682 | 7/1932 | Great Britain............. | 16/177 |

*Primary Examiner*—Raphael H. Schwartz
*Attorney*—William P. Porcelli

ABSTRACT: A cooking grill of a type having an open top-heated receptacle and a cover to enclose the open top provided with improved hinge means which is separable to permit entire removal of the cover and which is held assembled by improved shiftable keeper means.

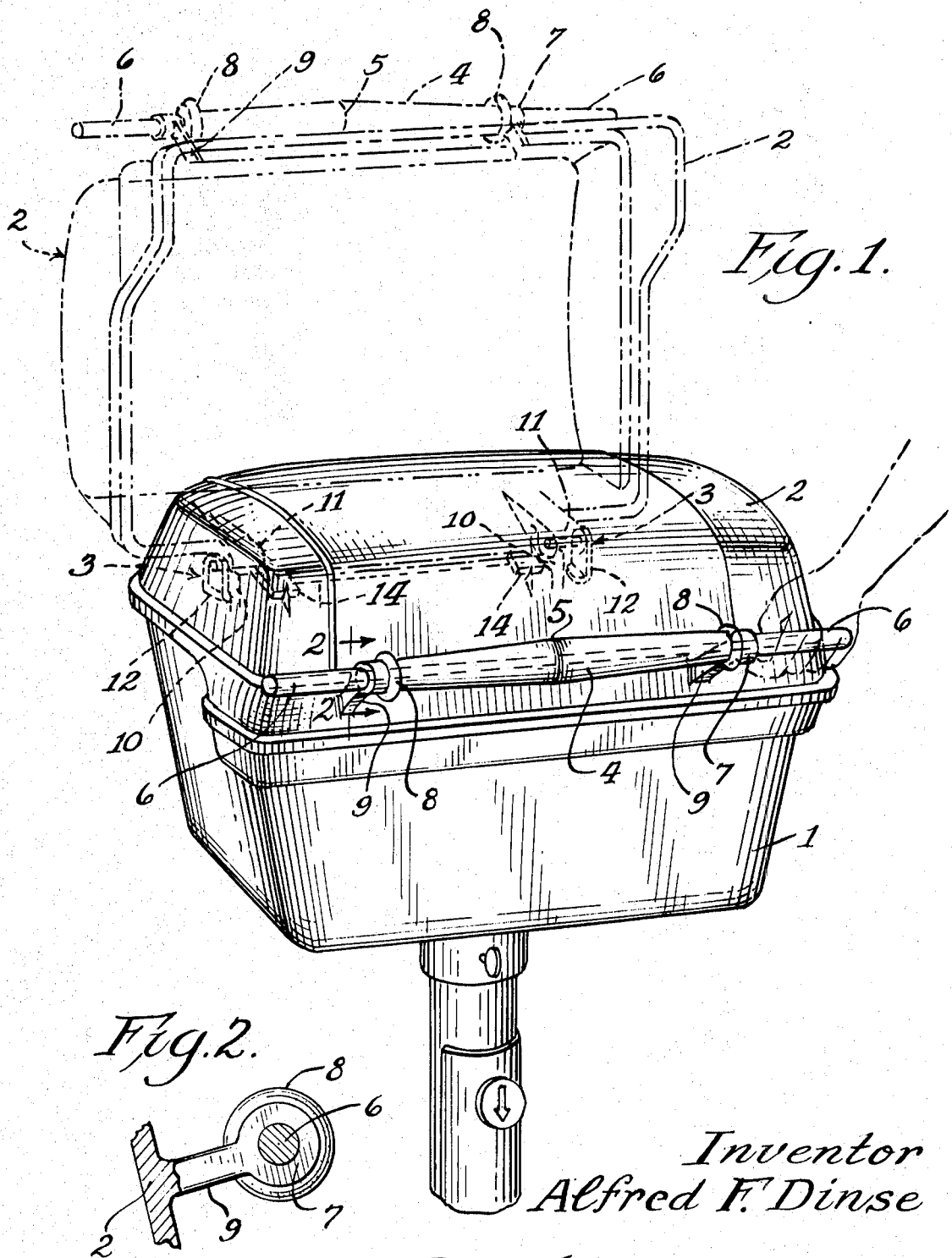

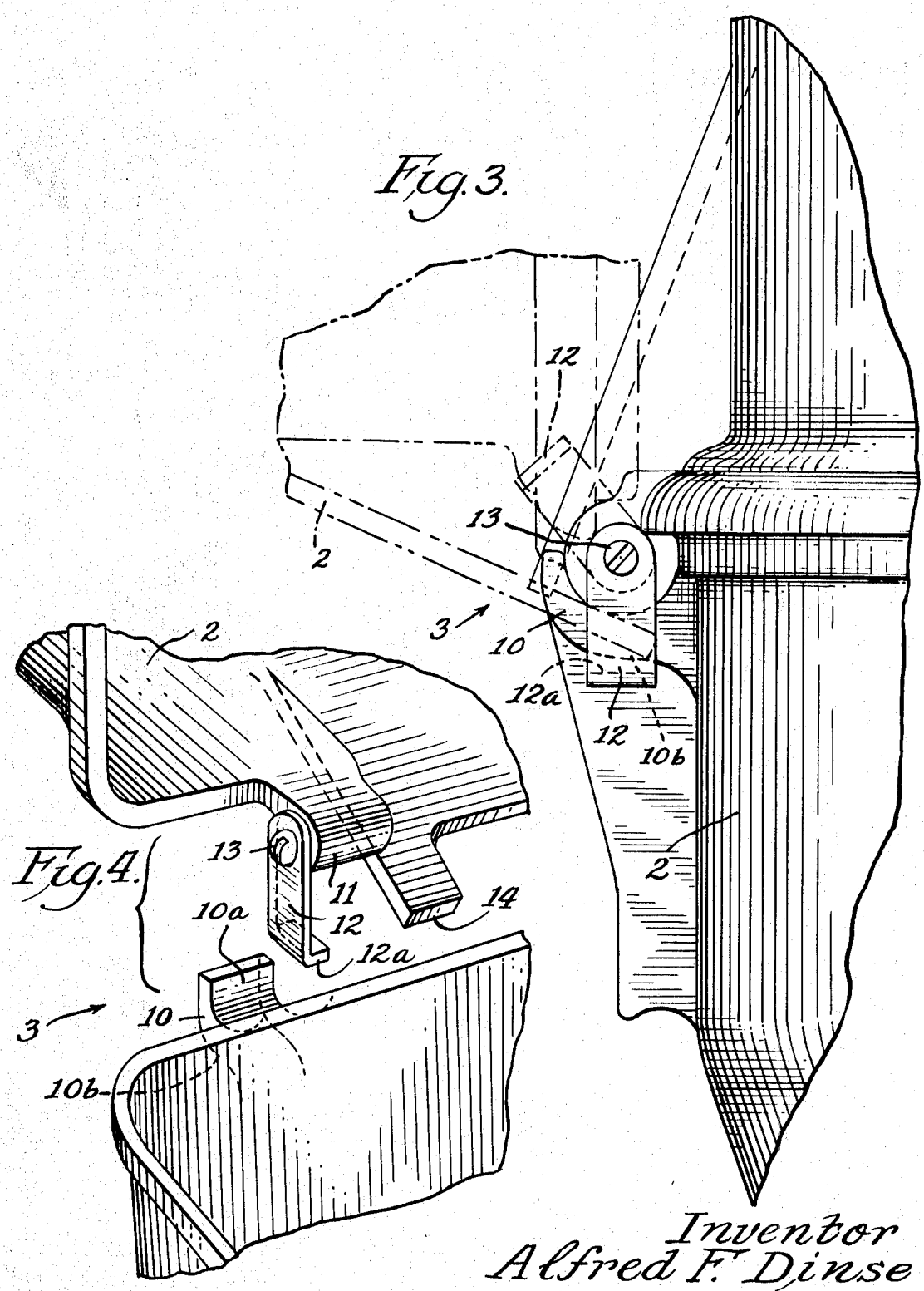

HINGE STRUCTURE FOR A COOKING-GRILL CONSTRUCTION

This invention relates to the art of cooking grills and particularly to the improved construction of an outdoor type barbecue grill employing either charcoal or gas as the fuel.

A cooking grill of the type mentioned has an open top receptacle housing a cooking grate on which the food is placed for cooking. The source of heat for heating the cooking grill and the food placed thereon is generally located below the cooking grate. The receptacle is provided with a cover which can be shifted between a position where it entirely covers the open top of the receptacle and a position where the open top is exposed. After food is positioned on the grill for cooking, the cover is moved to its closed position to retain heat within the grill. A handle is mounted on the cover to facilitate manipulation of the cover between its two positions.

With an improved type of handle, as disclosed in copending application, Ser. No. 804,844, filed Mar. 6, 1969, of James T. Warner, the cover can be elevated and lowered conveniently by manipulation from the side of the grill which provides an eccentric loading on the handle which is likewise transmitted to the hinge portions movably supporting the cover on the receptacle.

A typical hinge arrangement is one in which the tenon portions of the hinges cradle into trough-shaped mortises to provide the hinge connection which depends upon the weight of the cover to maintain the connection. to remove the cover from its hinge connection, it is necessary only to elevate the cover and its tenon portions away from the cradle of the mortise.

With this type of hinge arrangement, eccentric loading by manipulation of the cover from one side, tends to disconnect the hinge portioned on the side closest to the side at which the cover is being lifted. Therefore, instead of merely pivoting the cover from its closed to its open position, the hinge disconnects and the cover may slip out of control and possibly cause injury or become damaged by falling.

In order to overcome this problem, it is an important object of this invention to provide an improved hinge construction for the type of grill which might ordinarily be subject to eccentric loading upon elevation of its cover, by providing a keeper means associated with the hinge for maintaining the hinge connections, even with eccentric loading, but which keeper means can be displaced to provide simple removal of the cover from the grill when desired.

It is another object of the invention to provide such a keeper means which is held in place by force of gravity.

It is still another object of the invention to provide such a keeper means which is simple to construct and inexpensive to employ and which does not require any significant alteration of the hinge design.

The invention can be better understood upon reference to the accompanying drawings, in which:

FIG. 1 shows a three-quarter perspective view of an outdoor type grill embodying the invention;

FIG. 2 shows a sectional view along the line 2—2 of FIG. 1;

FIG. 3 shows an enlarged fragmentary side elevation of the hinge construction on the left side of the grill as shown in FIG. 1, and FIG. 4 shows an enlarged perspective view of the hinge portions of FIG. 3, except in exploded or disassembled arrangement.

As shown in FIG. 1, the grill embodying the invention consists of a housing or receptacle 1 for containing the ordinary components of such a grill, viz., a cooking grate and a source of heat plus other ordinary items. The receptacle 1 has an open top which is closed by means of a cover 2 pivoted on hinges 3 at the rear of the receptacle 1 to allow the cover 2 to be moved between the closed position shown in solid outline and the position shown in phantom outline in FIG. 1.

The cover is provided with a handle 4 which is a spindle of larger diameter at its center region 5 and of smaller diameter at its ends 6. Adjacent to its ends 6 the handle is carried by two journals 7 which are of slightly larger inside diameter than the outside diameter of the handle ends 6. In this way, the handle is journaled loosely. On the side of the journals 7 adjacent the central portion 5 of the handle, the handle is provided with enlarged flanges 8 which keep the handle 4 from shifting longitudinally on its axis through the journal 7.

The central handle portion 5 permits the cook to grip the handle 4 at its midregions 1, whereas, the handle ends 6 extend substantially to the side edges of the grill where they can be easily gripped by a person standing aside the unit. With the handle extending on both sides, it makes no difference whether the person is on one side or the other or centrally of the unit.

The journals 7 are mounted on arms 9 which are long enough to position the handle 4 a distance away from the cover 2 to insure that portions of the hand of the person do not come in contact with the cover 2 which may be relatively hot.

Each of the two hinges 3 are of identical construction, but of opposite hand. The left-hand hinge 3 is best shown in FIGS. 3 and 4. It consists of a channel-shaped mortise 10 projecting from the rear of the receptacle 1. It is has an upwardly concave semicircular shape. The cover is provided with a rounded tenon portion 11 dimensioned to mate the mortise portion 10 in a journal type of engagement. An L-shaped keeper 12 hangs from a fastener 13 engaging approximately concentrically with the radius of the outside curvature with the tenon portion 11. The keeper 12 hangs freely so that it is not restrained from angular movement by the fastener 13. At the lower end of the keeper 12 is an inwardly turned lip 12a which imparts the L-shape to the keeper. This lip 12a ordinarily positions below the lower surface 10b of the mortise portion 10. This lip 12a thereby prevents lifting of the tenon portion 11 out of the mortise portion 10 by accident.

When it is desired to lift the cover 2 off the receptacle 1, the keepers 12 are rotated clear of the surfaces 10b to permit it.

Although not shown in enlargement, the right-hand hinge connection 3 has identical corresponding parts as the left-hand hinge construction described but, of course, of opposite hand in construction or position.

The cover 2 is also provided with a projecting stop 14 which abuts against a projecting surface 15 on the receptacle 1 when the cover 2 is in open position, as indicated in phantom outline in both FIGS. 1 and 3. A stop 14 is provided adjacent each of the two hinges 3.

With this hinge construction, it should be evident that eccentric manipulation of the handle 4, as indicated in FIG. 1, from the right-hand side of the unit, will cause the right-hand hinge to tend to disassemble. With the keeper 12 in place, disassembly is prevented. Likewise, if the handle 4 is lifted from its opposite end, the left-hand hinge connection would tend to disassemble. Again, the keeper 12 on the left-hand hinge 3 prevents such disassembly. However, when it is desired to remove the cover 2, the keepers 12 are rotated sufficiently to clear the surface 10b and permit disassembly of the hinges 3.

What has been shown is a simple construction which has particular advantage in the combination involving means for manipulating a cover for such a grill in a manner to create eccentric loading on the hinges and prevent accidental disassembly of the hinges which might otherwise occur with eccentric loading.

Although only a single embodiment of the invention has been shown and described, it should be clearly understood that the invention can be made in many different ways without departing from the true scope of the invention as defined by the appended claims in which:

I claim:

1. A cooking grill comprising an open top-heated receptacle, a cover to enclose the open top of the receptacle and a handle projecting from the cover to facilitate manual displacement of the cover relative to the receptacle for both covering and uncovering of the receptacle, hinge means provided between the cover and the receptacle which permits displacement of the cover relative to the receptacle through an arc of movement, the hinge means comprising a tenon and mortise connection held in engagement by the weight of the cover and separable for removing the cover entirely from the receptacle, a keeper in position adjacent a tenon and mortise connection to maintain assembly of the connection the tenon and mortise connection comprising an open top trough-shaped mortise at the rear of the receptacle with a convex tenon projecting downwardly from the cover, whereby when the hinge connection is assembled the tenon portion rests in the mortise portion, the keeper hanging by force of gravity in a position extending below the connection to block disassembly of the connection and movable from the hanging position to a position permitting disassembly of the connection.

2. A cooking grill comprising an open top-heated receptacle, a cover to enclose the top of the receptacle and a handle projecting from the cover to facilitate manual displacement of the cover relative to the receptacle for both covering and uncovering of the receptacle, hinge means provided between the cover and the receptacle which permits displacement of the cover relative to the receptacle through an arc of movement, the hinge means comprising a tenon and mortise connection held in engagement by the weight of the cover and separable for removing the cover entirely from the receptacle, a keeper in position adjacent a tenon and mortise connection to maintain assembly of the connection, the tenon and mortise connection comprising an open top trough-shaped mortise at the rear of the receptacle engageable with a convex tenon portion projecting downwardly from the cover, whereby when the hinge connection is assembled the tenon portion rests in the mortise portion said keeper being pivotally mounted on a pivot approximately concentric with the arc of curvature of the convex tenon portion and extending downwardly when held by gravity to engage a portion of the receptacle below the portion of the trough-shaped mortise engageable with the convex tenon portion and block disassembly of the connection.

3. A cooking grill comprising an open top-heated receptacle, cover to enclose the open top of the receptacle and a handle projecting from the cover to facilitate manual displacement of the cover relative to the receptacle for both covering and uncovering of the receptacle, hinge means provided between the cover and the receptacle which permits displacement to cover relative to the receptacle through an arc of movement, the hinge means comprising a tenon and mortise connection held in engagement by the weight of the cover and separable for removing the cover entirely from the receptacle, a keeper in position adjacent a tenon and mortise connection to maintain assembly at the connection the hinge means being divided into two separate hinges each with a separable tenon and mortise in axial alignment with each other and a keeper, the keeper being positioned on opposite sides of the hinges to restrain axial displacement of the tenons with respect to the mortises and thereby restrain lateral displacement of the cover relative to the receptacle.

4. A cooking grill comprising an open top-heated receptacle, a cover to enclose the open top of the receptacle and a handle projecting from the cover to facilitate manual displacement of the cover relative to the receptacle for both covering and uncovering of the receptacle, hinge means provided between the cover and the receptacle with which permits displacement of the cover relative to the receptacle through an arc of movement, the hinge means comprising a tenon mortise connection held in engagement by the weight of the cover and separable for removing the cover strictly from the receptacle, a keeper in position adjacent a tenon and mortise connection to maintain assembly of the connection the tenon and mortise connection comprising an open top trough-shaped mortise at the rear of the receptacle engageable with a convex tenon portion projecting downwardly from the cover, whereby when the hinge connection is assembled the tenon portion rests in the mortise portion, said keeper being pivotally mounted on a pivot approximately concentric with the arc of curvature of the convex tenon portion and extending downwardly when held by gravity to engage a portion of the receptacle below the portion of the trough-shaped mortise engageable with the convex tenon portion and block disassembly of the connection, the keeper being "L"-shaped, with the "L"-shape formed by a vertical part of the keeper which engages the portion of the receptacle below the portion of the trough-shaped mortise to block disassembly of the connection.

UNITED STATES PATENT OFFICE
CERTIFICATE OF CORRECTION

Patent No. 3,567,065                    Dated March 2, 1971

Inventor(s)  Alfred F. Dinse

It is certified that error appears in the above-identified patent and that said Letters Patent are hereby corrected as shown below:

Column 2, line 22, cancel "is"; Column 3, line 16, "top" should read -- open top --; line 39, "cover" shoul read -- a cover --. Column 4, line 3, "to" should read -- of the --; line 11, "keeper" should read -- keepers --; line 22, "mortise" should read -- and mortise --; line 38, after "part" insert -- and a laterally extending part connected thereto which is the part --.

Signed and sealed this 30th day of November 1971.

(SEAL)
Attest:

EDWARD M. FLETCHER, JR.        ROBERT GOTTSCHALK
Attesting Officer              Acting Commissioner of Pate